United States Patent [19]
Chattin

[11] Patent Number: 5,163,881
[45] Date of Patent: Nov. 17, 1992

[54] AUTOMATIC TRANSMISSION FOR MULTI-SPEED BICYCLE

[75] Inventor: Jessie R. Chattin, Tampa, Fla.
[73] Assignee: Trans-Chattin, Inc., Tampa, Fla.
[21] Appl. No.: 806,866
[22] Filed: Dec. 12, 1991
[51] Int. Cl.⁵ .............................................. F16H 9/00
[52] U.S. Cl. ...................................... 474/78; 474/80
[58] Field of Search ............................... 474/77–82, 474/101; 280/238, 236, 281

[56] References Cited

U.S. PATENT DOCUMENTS

| | | | |
|---|---|---|---|
| 4,601,682 | 7/1986 | Nagano | 474/78 |
| 4,838,837 | 6/1989 | Testa | 474/80 |
| 4,840,605 | 6/1989 | Testa | 474/80 |
| 4,842,568 | 6/1989 | Marchigiano | 474/80 |

Primary Examiner—Thuy M. Bui
Attorney, Agent, or Firm—Dominik, Stein, Saccocio, Reese, Colitz & Van Der Wall

[57] ABSTRACT

A derailer for derailing a drive chain from one sprocket to an adjacent sprocket of a multi-stage sprocket assembly wherein operation of the derailer thereof is automatically controlled by centrifugal force so that the driving chain is automatically shifted to higher gears as the speed of the bicycle increases.

12 Claims, 10 Drawing Sheets

AUTOMATIC TRANSMISSION FOR MULTI-SPEED BICYCLE

BACKGROUND OF THE INVENTION

1. Field of the Invention

This invention relates to an automatic transmission for a bicycle. More particularly, this invention relates to a multi-speed bicycle employing a multi-stage sprocket assembly, wherein operation of the derailer thereof is automatically controlled by centrifugal force so that the driving chain is automatically shifted to higher gears as the speed of the bicycle increases.

2. Description of the Background Art

Presently there exists many types of bicycle transmissions. The earliest type of a bicycle transmission consisted of a rear wheel having a three-speed hub whose internal gearing was manually shifted by means of a selector cable extending from a selector lever conveniently positioned on the handle bars to a movable selector axle within the rear hub. During cycling, the three-speed bicycle could be easily shifted into low, medium and high gears by moving the selector lever to a low, medium or high position, respectively.

In subsequent years, improvements were made to the conventional three-speed bicycles to make the gear shifting in the three-speed hub fully automatic depending upon the speed of the bicycle. Thus, starting from rest, the automatic transmission of the three-speed hub would be initially set to the low gear and, upon acceleration of the bicycle to higher speeds, would automatically shift to middle gear and then to high gear. This automatic shifting therefore obviated the need for the bicyclist to manually change gears via a manual selector lever.

U.S. Pat. Nos. 3,494,227, 3,492,892, 3,492,893, 3,081,641, 3,513,726, 3,520,214, 3,546,970, 3,546,971, 3,552,233, 3,592,081, 3,600,974, 3,603,178, 3,608,398, 3,648,547, 3,659,688, 3,661,034, 3,696,690, 3,701,292, 3,830,521 and 4,229,997 disclose various embodiments of automatic three-speed rear hubs. In most of these prior patents, the automatic shifting feature is accomplished through the use of centrifugal weights positioned within the hub and centrifugally operated to shift gears upon increased rotational speed of the hub corresponding to increased speed of the bicycle.

In more recent years, the use of three-speed bicycles have been largely supplanted by ten-speed (or more) bicycles. More particularly, a conventional ten-speed bicycle comprises a pair of drive sprockets of different diameters positioned at the axis of rotation of the bicycle pedals and a multi-stage sprocket assembly consisting of five drive sprockets of different diameters positioned at the axis of rotation of the hub of the rear wheel of the bicycle. The pedal drive sprockets and the rear wheel drive sprockets are operatively interconnected by means of a drive chain. Mechanisms known as "derailers" are provided for derailing the drive chain from one sprocket to another of the two pedal sprockets and from one sprocket to another one of the five rear sprockets thereby changing the gear ratio. A control lever is connected to each derailer by means of a control cable. Thus, selected movement of the control levers controlling the respective derailers allows the bicyclist to select any one of ten possible gear ratios thereby resulting in "ten-speeds". It is also noted that a tension wheel is provided to take up slack in the drive chain thereby making sure that the drive chain remains taut at any gear speed. U.S. Pat. Nos. 4,895,553, 3,661,021, 4,277,077, 4,580,997, and 4,612,004 disclose various gearing mechanisms employed in a conventional ten-speed bicycle. It is noted that even more recently, twenty-one-speed bicycles have been developed which comprise three pedal sprockets and seven rear sprockets, thereby providing twenty-one possible speed combinations.

Analogous to the development of three-speed bicycle hubs, most recent developments of ten-speed bicycles have consisted of employing centrifugal weights which function to automatically control the gear shifting depending upon the speed of the bicycle. For example, in U.S. Pat. No. 3,513,725, an automatic speed change mechanism is disclosed for a ten-speed bicycle wherein the automatic shifting feature is accomplished with the use of centrifugal weights positioned within the multi-stage bracket assembly. In U.S. Pat. No. 4,836,046, an automatic bicycle transmission is disclosed which comprises a sprocket wheel pedal assembly including a reference wheel that is rotated by the pedals of the bicycle. A pair of diametrically opposed chain gear sliders and opposed chain gliders are provided for radially moving along radial slots of the sprocket wheel assembly in response of input torque applied at the pedals, thereby changing the effective diameter of the front sprocket and causing speed changes. In U.S. Pat. No. 4,743,041, an automatically variable gear ratio drive mechanism for a bicycle is disclosed which comprises a pulley whose diameter varies by means of a centrifugal weight in such a manner that the effective diameter of the pulley decreases as the bicycle's speed is increased, thereby functioning to change the effective gearing ratio.

Similarly, U.S. Pat. No. 4,701,152 discloses an automatic transmission for a multi-speed bicycle having a multi-stage rear sprocket assembly. The automatic gear shifting is accomplished by means of a plurality of centrifugal weights which are slideably disposed on the spokes of the rear wheel. The centrifugal weights are operatively connected by means of cables to extensible pistons rigidly connected to the rear hub of the bicycle. The extensible rods of the pistons are connected about the periphery of a ring-shaped support which, upon extension of the piston rods, extends outwardly to be in the respective planes of the sprockets of the multi-stage sprocket assembly. In its preferred embodiment shown in FIGS. 11 and 12 thereof, a derailer is operatively connected to the peripheral edge of the ring-shaped support in such a manner that the derailer is forced into alignment with the selected sprocket by the ring-shaped support as determined by the centrifugal force imparted to the pistons by means of the centrifugal weights. Unfortunately, it has been found that the centrifugal weights sliding on their respective spokes results in undesired downshifting of the gears the moment the bicyclist resumes pedaling after coasting. Furthermore, some bicyclists have found it desirable to be able to select an upper gear that the bicyclist feels comfortable using, even though the desired gear may not be the highest gear of the multi-speed bicycle. The automatic transmission disclosed in U.S. Pat. No. 4,701,152 fails to disclose any means for limiting the movement of its centrifugal weights so as to limit the corresponding movement of its ring-shaped support and its derailer selecting the highest sprocket, corresponding to the highest gear desired. In U.S. Pat. No. 3,540,309, similar concepts are employed for centrifugally causing gear changing of the pedal change sprocket.

Therefore, it is an object of this invention to provide an apparatus which overcomes the aforementioned inadequacies of the prior art devices and provides an improvement which is a significant contribution to the advancement of automatic transmissions for bicycles.

Another object of this invention is to provide an automatic transmission for a bicycle having a multi-stage rear sprocket assembly and derailer, wherein the automatic derailing of the drive chain is accomplished by means of centrifugal weights operatively connected to the derailer to move the derailer in response to increased speed of the bicycle.

Another object of this invention is to provide an automatic transmission for a bicycle having a multi-stage rear sprocket assembly and derailer whose operation is controlled by centrifugal weights, wherein the centrifugal weights allow the bicyclist to resume pedaling after coasting in the same gear that existed prior to coasting.

Another object of this invention is to provide an automatic transmission for a bicycle having a multi-stage rear sprocket assembly and derailer controlled by centrifugal weights, wherein means are provided for selecting a range of operation of the centrifugal weights so as to allow the bicyclist to select a shifting range employing less than all of the possible gearing combinations.

Another object of this invention is to provide an automatic transmission for a bicycle having a multi-stage rear sprocket assembly and derailer controlled by centrifugal weights, and further including means for limiting the highest gear into which the centrifugal weights moves the derailer into so as to permit the bicyclist to select an upper limited gear which is less than the highest possible gear.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an automatic transmission for a multi-speed bicycle employing a multi-stage rear sprocket assembly having different-diameter sprockets and having a derailer for selectively derailing the drive chain from one sprocket to an adjacent sprocket by means of centrifugal force imparted to the derailer in response to increased speed of the bicycle. Thus, the centrifugally operated derailer of the invention functions to automatically upshift the bicycle from a low gear to incrementally higher gears as the speed of the bicycle increases. Then, as the speed of the bicycle decreases, a biasing spring of the derailer overcomes the centrifugal force, thereby causing the derailer to incrementally down-shift the drive chain from one sprocket to the adjacent sprocket.

More particularly, the centrifugal force employed to cause movement of the derailer is created by means of centrifugal weights connected to a rotatable shaft positioned through the base member of the derailer. A gear is rigidly fixed to the end of the rotatable shaft in alignment with a corresponding drive gear rigidly affixed to and positioned concentrically with the multi-stage sprocket assembly so as to rotate therewith. The collar is positioned about the rotatable shaft and is pivotably connected to each of the centrifugal weights in such a manner that, upon rotation of the shaft, outward centrifugal pivoting of the centrifugal weights occurs and the collar is forced outwardly away from the base member. The collar is operatively connected to the linkage members of the derailer by means of a yoke such that upon outward movement of the collar by means of the pivoting centrifugal weights, the chain guide of the derailer is moved outwardly to derail the drive chain from a larger diameter sprocket to an adjacent smaller diameter sprocket, thereby resulting in upshifting to a higher gear as the speed of the bicycle increases.

An important feature of this invention is the connection of the centrifugal weights to the rotatable shaft which extends through the base member of the derailer. This arrangement assures that the bicycle may coast without immediate downshifting. Thus, unlike prior art automatic transmissions employing centrifugal weights on the spokes of the rear wheel, downshifting during coasting does not occur until the speed of the bicycle appreciably decreases.

The automatic transmission of this invention further includes a range selector for selecting the range of gears into which the transmission can be shifted. The range selector comprises a control lever, conveniently positioned on or near the handle bars of the bicycle, connected to a cable assembly which extends to the base member of the derailer. The reciprocating cable in the assembly is operatively connected to the biasing spring of the derailer. Operation of the control lever to increase the force of the biasing spring results in a greater force imparted to the linkage members to remain inwardly, thereby resulting in the drive chain being derailed, at given speeds, among the higher diameter sprockets corresponding to lower gears. Conversely, operation of the control lever to decrease the force of the biasing spring results in less force imparted to the linkage members of the derailer thereby resulting in the drive chain being derailed at the same given speeds, among the lower diameter sprockets corresponding to higher gears. Thus, it can be readily appreciated that the range selector of the invention allows the bicyclist to select a lower-gear range or a higher-gear range of operation at given speeds.

The automatic transmission of this invention further includes a gear limiter which limits the highest gear that the derailer is permitted to upshift the chain into. The gear limiter of the invention comprises a control lever, conveniently positioned on or near the handle bars of the bicycle, connected to a cable assembly which extends to the base member of the derailer. The reciprocating cable in the cable assembly is threaded through a sleeve pivotably connected to the linkage members. A stop is rigidly connected to the tip of the cable. Operation of the control lever to retract the cable causes the stop to engage the sleeve thereby limiting the outward extension of the linkage members. Thus, it can be readily appreciated that the gear limiter functions to limit the highest gear that the derailer is permitted to upshift the chain into, irrespective of the speed of the bicycle. More particularly, should the multi-stage rear sprocket assembly consist of six sprockets of decreasing diameters, the bicyclist may adjust the control lever of the gear limiter to select one of the sprockets thereby assuring that the derailer will upshift only to that selected sprocket corresponding to the highest desired gear, despite the increasing speed of the bicycle which would otherwise cause further upshifting to higher gears.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
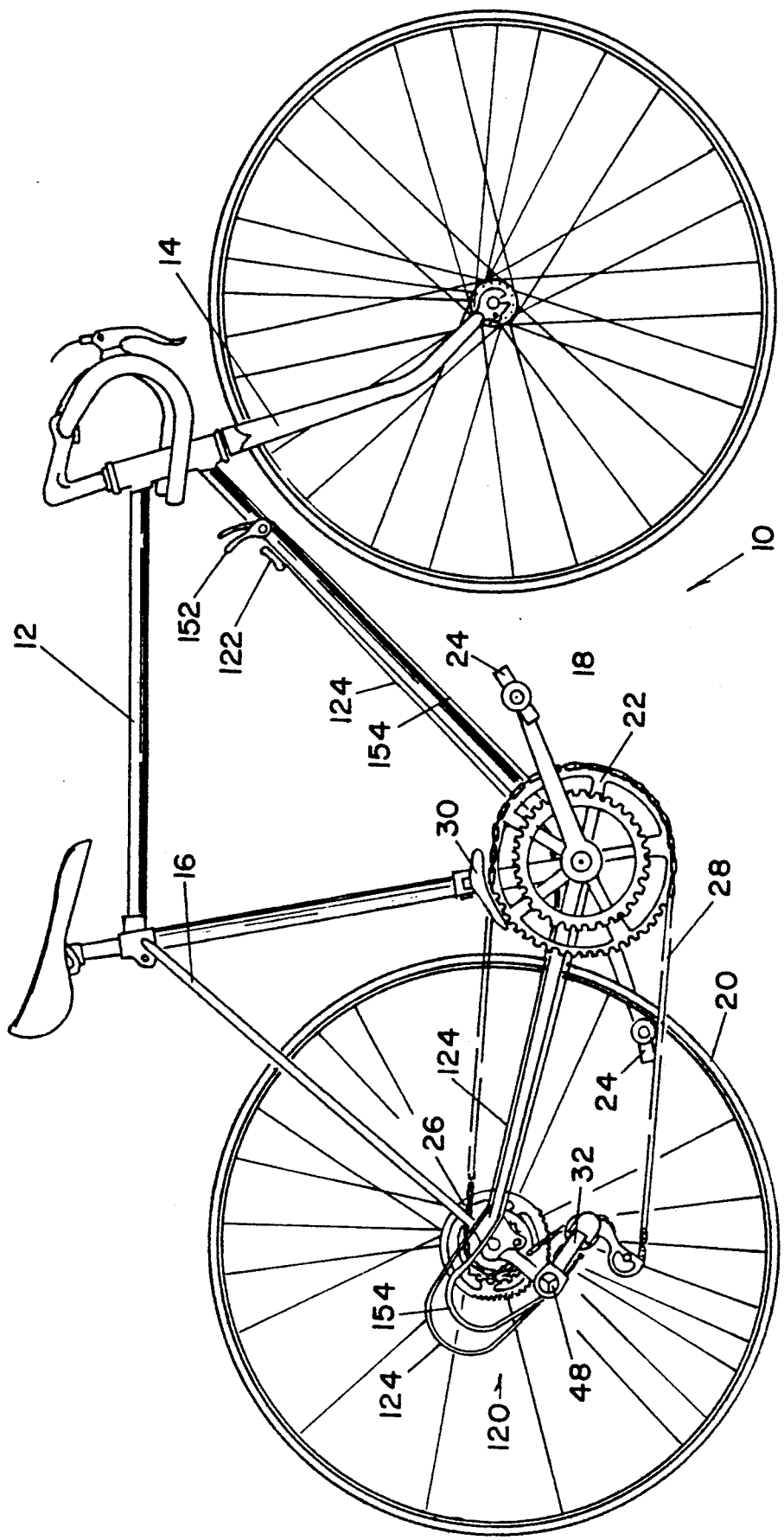
FIG. 1 is a side view of the multi-speed bicycle employing the derailer of the invention.

Referring to FIG. 1, a conventional multi-speed bicycle 10 comprises a frame 12 having front and rear fork assemblies 14 and 16, respectively. Front and rear wheels 18 and 20 are connected between the respective forks 14 and 16. A front multi-stage sprocket assembly 22 having pedals 24 is connected to the frame 12. A multi-stage rear sprocket assembly 26 forms part of the rear wheel 20. The front and rear sprocket assemblies 22 and 26 are interconnected by drive chain 28. Front and rear derailers 30 and 32 are provided for the multi-stage front and rear sprocket assemblies 22 and 26, respectively, each of which derails the drive chain 28 from one sprocket to another, thereby changing the gear ratio between the front and rear sprocket assemblies 22 and 26 an causing speed changes.

As shown in FIGS. 2-5, the multi-stage rear sprocket assembly 26 is illustrated as comprising six sprockets 34-44 of decreasing diameters. However, it is noted that the multi-stage rear sprocket assembly 26 may comprise any number of sprockets without departing from the spirit and scope of this invention. The rear derailer 32 of the invention functions to derail the drive chain 28 from a sprocket in which it is engaged to an adjacent sprocket thereby effectuating speed changes.

Figure 2:
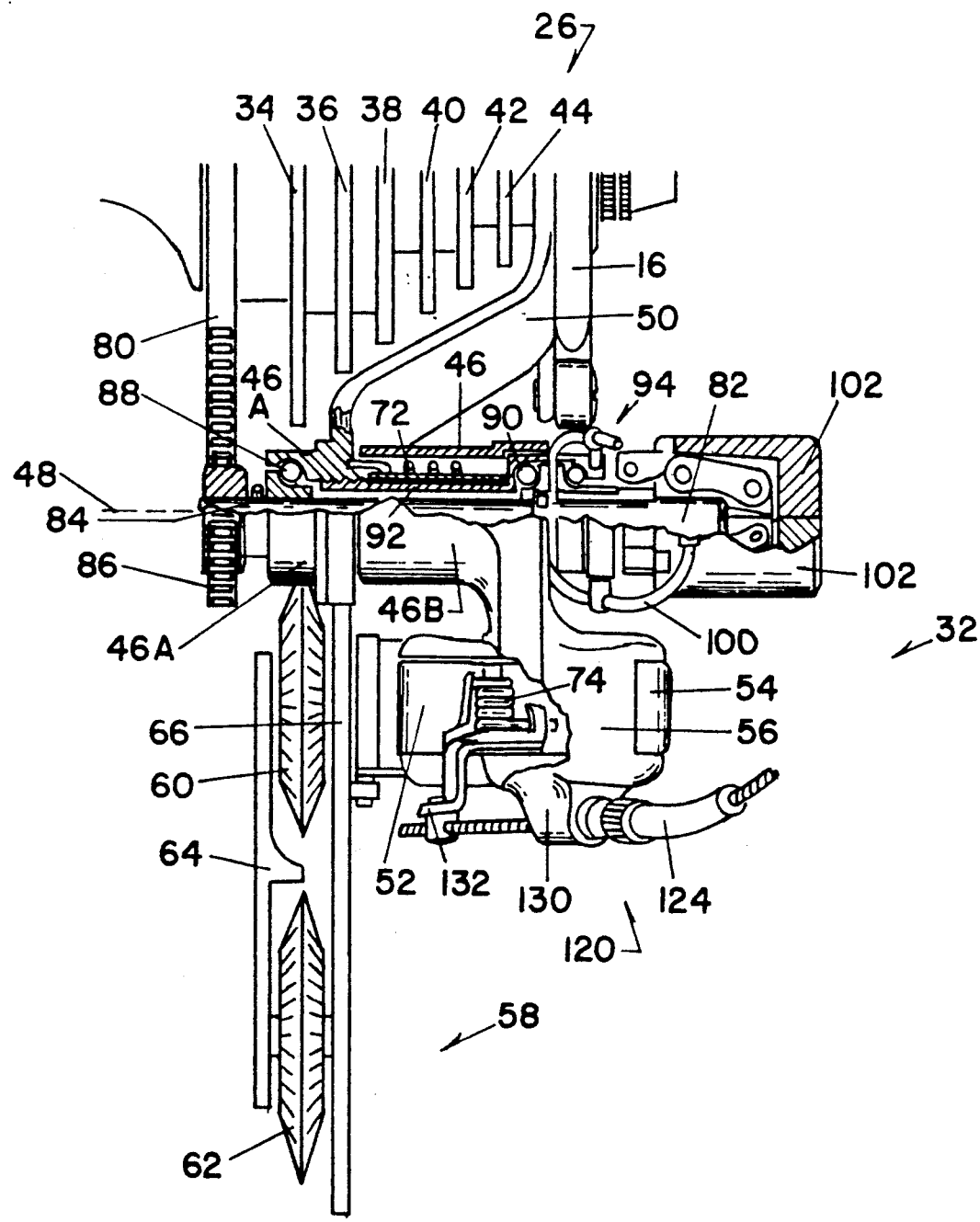
FIG. 2 is a rear elevational view of the multi-stage rear sprocket assembly employing the automatic transmission of the invention having its gear range selector, with the centrifugal weights thereof fully contracted corresponding to the lowest gear.

The rear derailer 32 of the invention comprises a base member 46 having a longitudinal axis 48 positioned parallel to the axis of rotation of the rear wheel 20 (see FIGS. 1 and 2). The base member 46 of the rear derailer 32 is connected to a bracket 50 which is in turn securely connected to the rear fork 16 of the frame 12 of the bicycle 10. A pair of linkage members 52 and 54 are pivotably connected to a protruding end 56 of the base member 46. The other ends of the linkage members 52 and 54 are similarly pivotably connected to a chain guide assembly 58.

The chain guide assembly 58 comprises a chain guide sprocket 60 and an idler tension sprocket 62 rotatably journalled to a plate 64. A boss 66 extends from the plate 64 and includes a protruding end 68 to which the ends of the linkage members 54 are pivotably connected. Boss 66 contains a bias spring (not shown) which biases plate 64 in a clockwise direction shown in FIG. 4 such that the idler tension wheel 62 takes up any slack that may exist in the drive chain 28 which is threaded around the sprockets 60 and 62 as shown in phantom in FIG. 4.

It is noted that the linkage members 54 form a parallelogram to assure that the axis of rotation of the sprockets 60 and 62 remain parallel to the longitudinal axis 48 of the base member 46 as the linkage members 50 and 52 are moved outwardly. It is further noted that the base member 46 is composed of two sections 46A and 46B rotatably journalled together. An interior bias spring 72 is provided for biasing the outer section 46B rearwardly. Similarly, a bias spring 74 is positioned about the axis of one of the linkage members 52 connected to the protruding end 56 of base member 46 so as to bias the linkage members 52 and 54 inwardly corresponding to low gear.

The following description describes the automatic shifting feature of the present invention. Specifically, a large diameter drive gear 80 is rigidly affixed to and positioned concentrically with the multi-stage sprocket assembly 26. A rotatable shaft 82 is rotatably journalled through the base member 46. A gear 86 is rigidly connected to the inward end 84 of the rotatable shaft 82 in geared engagement with the drive gear 80 such that, upon rotation of the drive gear 80, rotatable shaft 82 is rotated. Journal bearings 88 and 90 along with a threadably removable bushing 92 may be provided for minimizing wear as the shaft 82 rotates within base member 46 and as the sections 46A and 46B of the base member 46 rotate with respect to each other.

Figure 9:
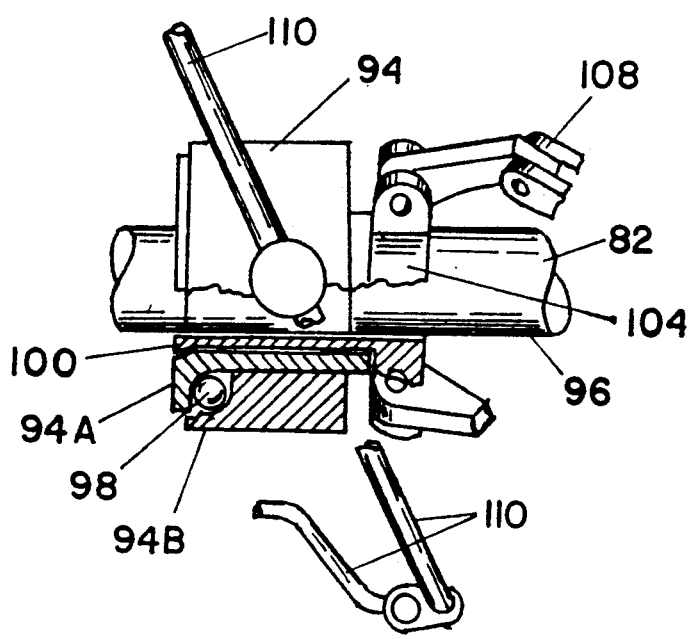
FIG. 9 is a partial view of the automatic transmission of the invention illustrating the sleeved collar thereof, partially cut away.

As shown in FIG. 9 in conjunction with FIGS. 2-5, a collar assembly 94 is provided for connection about the outward end 96 of the shaft 82. The collar assembly 94 comprises inner and outer collar sections 94A and 94B journalled together by means of bearing 98. The inner section 94A of the collar assembly 94 is rigidly connected to a sleeve 100 positioned over the outward end 96 of the shaft 82.

Figure 3:
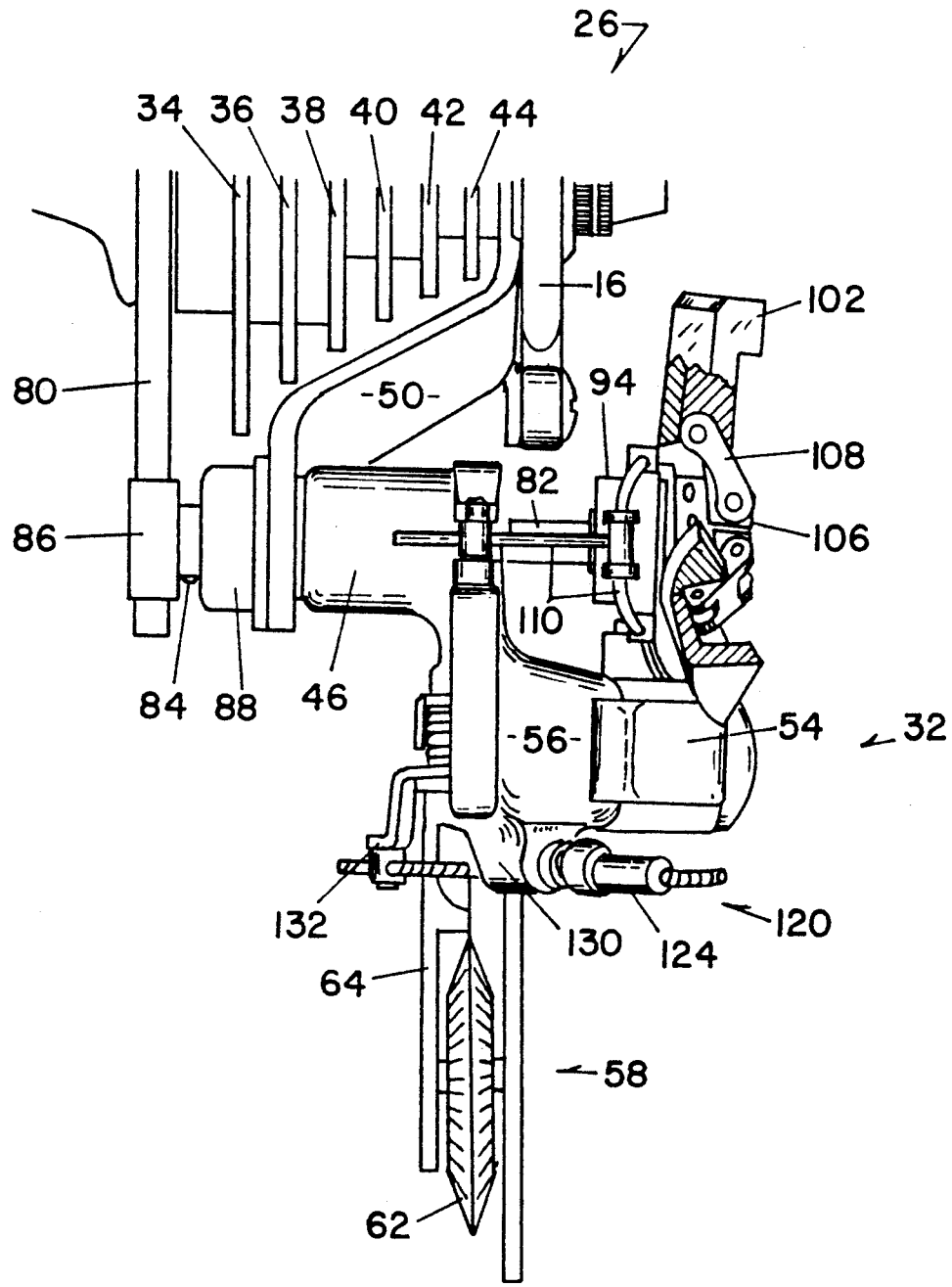
FIG. 3 is a rear elevational view of the multi-stage rear sprocket assembly employing the automatic transmission of the invention having its gear range selector, with the centrifugal weights fully expanded corresponding to the highest gear.
Figure 4:
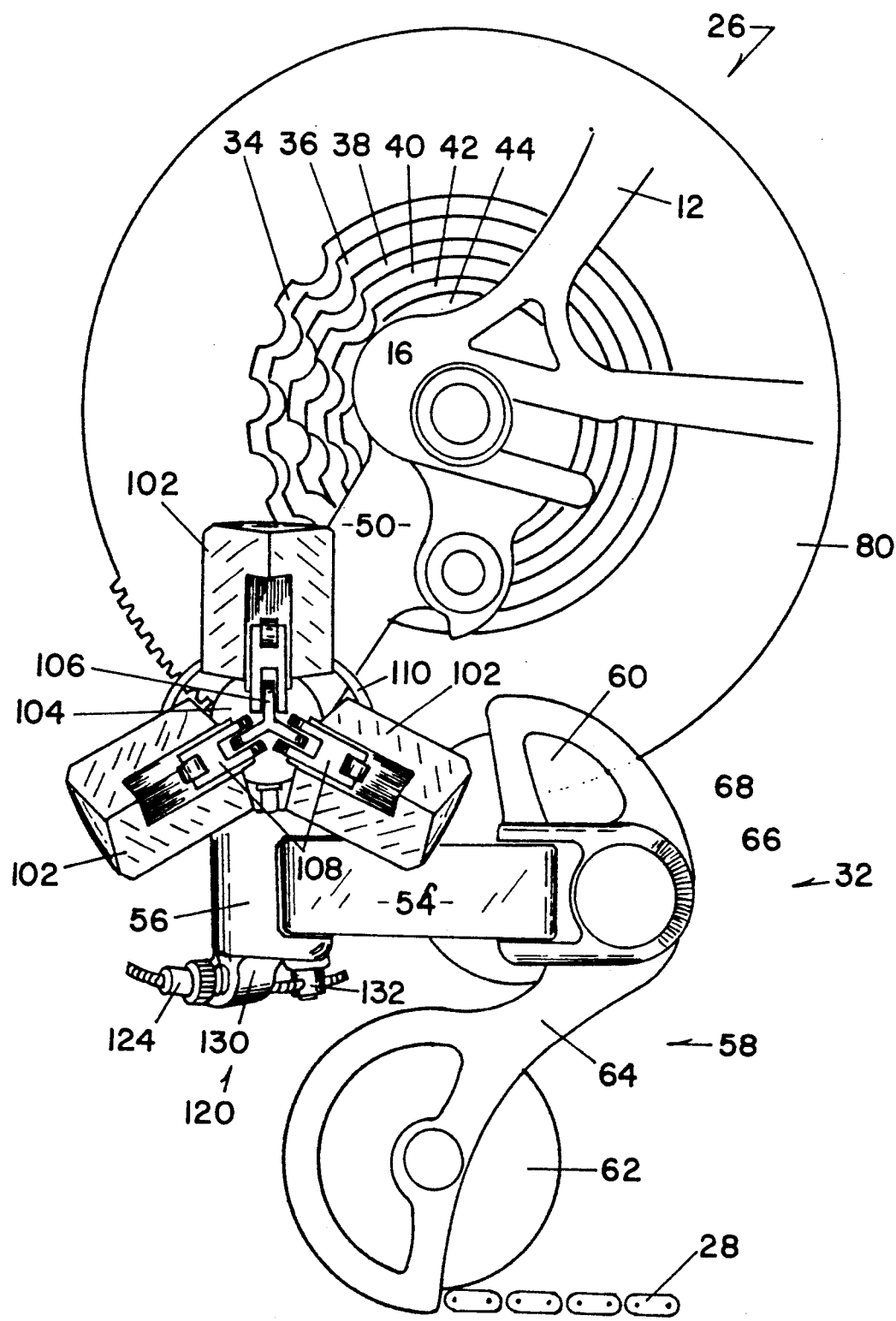
FIG. 4 is a side elevational view of FIG. 3.
Figure 5:
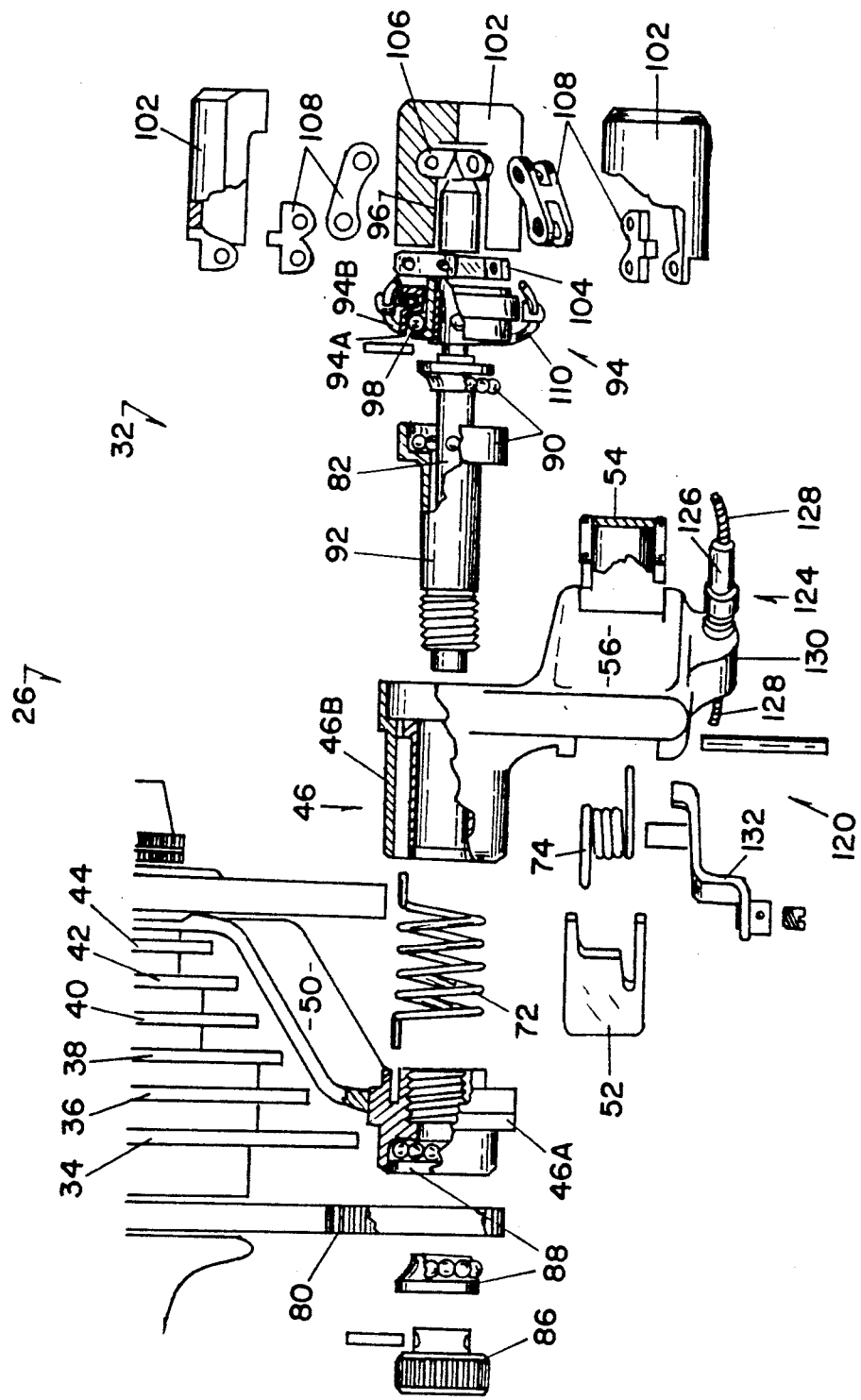
FIG. 5 is an exploded view of FIG. 2.
Figure 6:
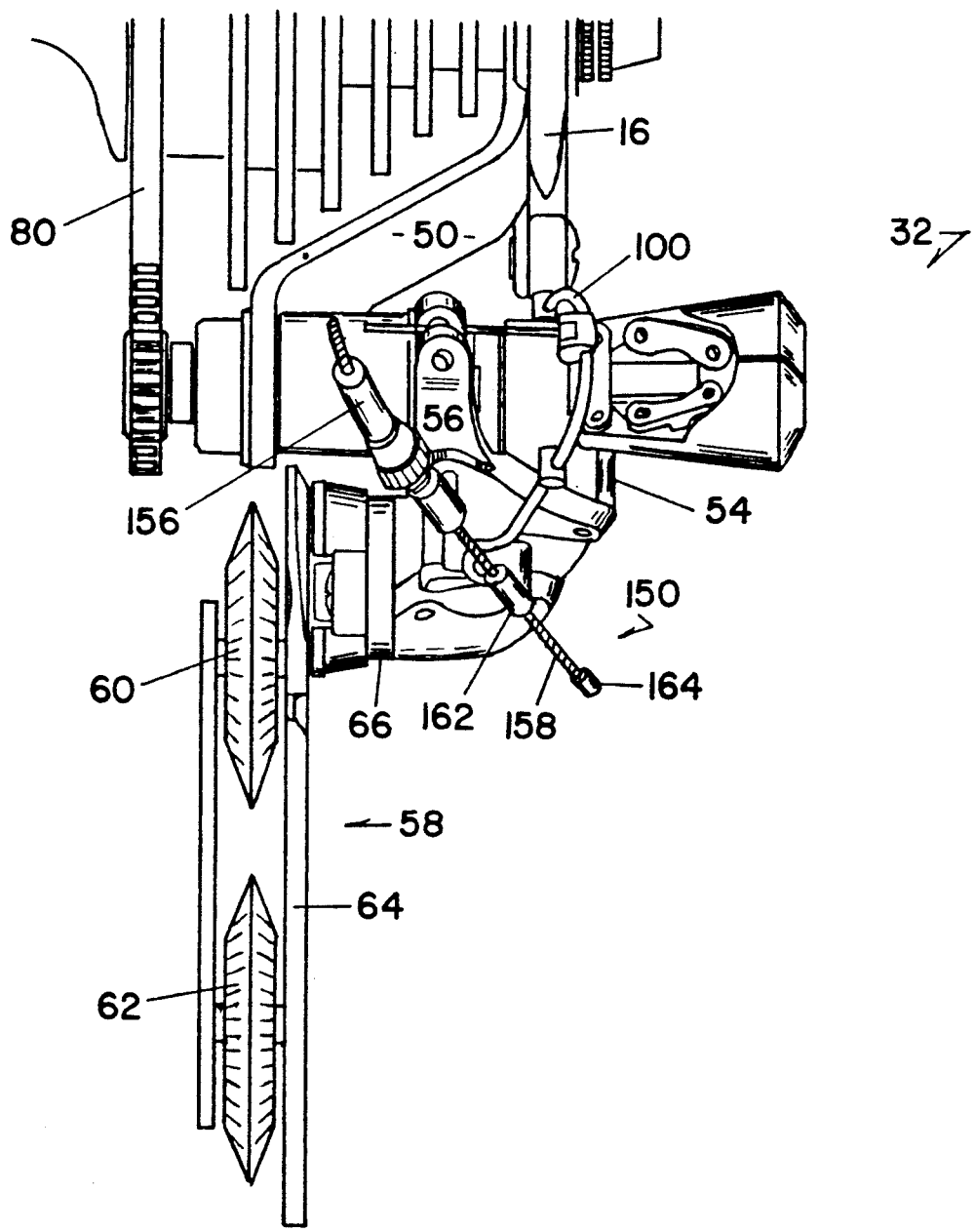
FIG. 6 is a rear elevational view of the multi-stage rear sprocket assembly employing the automatic transmission of the invention having its gear range limiter, with the centrifugal weights thereof fully contracted corresponding to the lowest gear.
Figure 7:
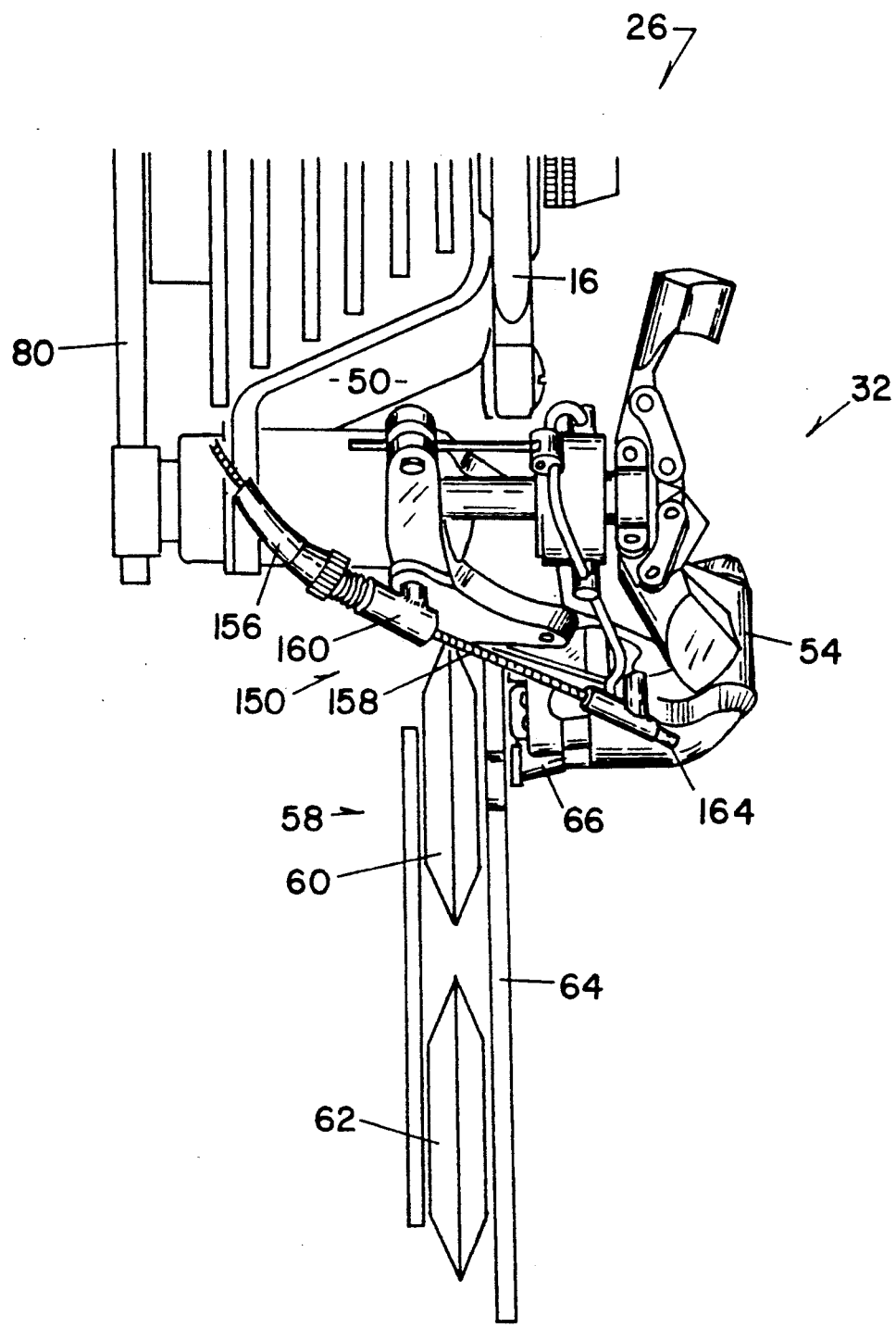
FIG. 7 is a rear elevational view of the multi-stage rear sprocket assembly employing the automatic transmission of the invention having its gear limiter, with the centrifugal weights thereof fully expanded corresponding to the highest gear.
Figure 8:
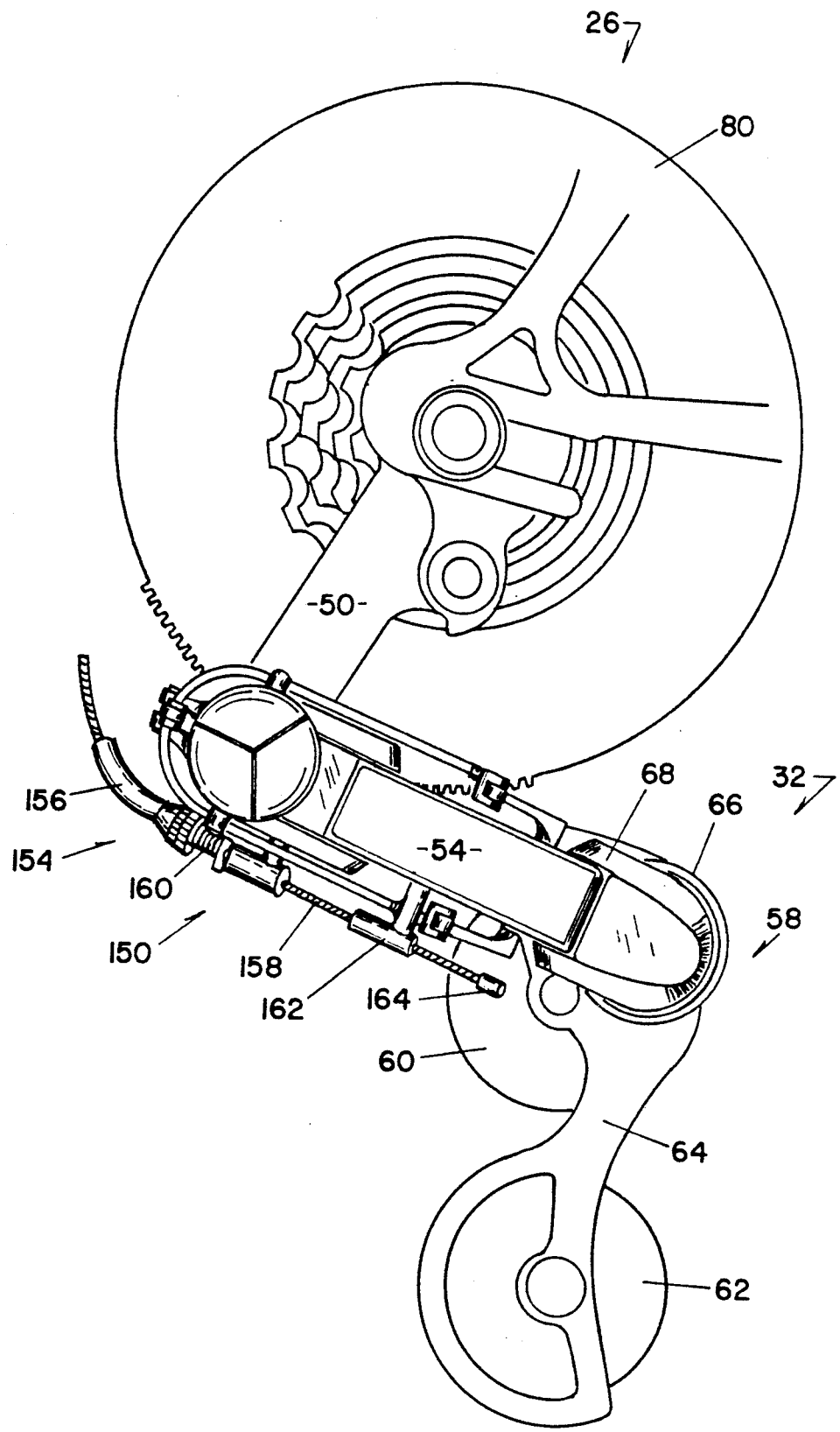
FIG. 8 is a side elevational view of FIG. 6.

A plurality of centrifugal weights 102 (three are illustrated) are pivotably connected to each other and to a star-shaped collar 104 integrally formed with sleeve 100. More particularly, each of the centrifugal weights 102 is pivotably connected to each other by means of a star-shaped connector 106 and to the star-shaped collar 104 by means of interconnecting linkages 108. Rotation of shaft 82 rotates the centrifugal weights 102 via the star-shaped connector 106 which in turn rotates the star-shaped collar 104, sleeve 100, and inner collar sections 94A. As the rotational speed of the shaft 82 increases, the centrifugal weights 102 flare outwardly as shown in FIGS. 3 and 4 forcing the star-shaped connector 106 to exert pressure against the tip of the rotatable shaft 82. The collar assembly 94 therefore extends outwardly. Yoke 110, pivotally connected at one end to base member 46 and at its other end to the outer linkage member 54, pivots on the outer collar section 94B of the collar assembly 94 causing outward tension on the outer linkage member 54 against the force of bias springs 72 and 74. The chain guide assembly 58 is therefore caused to move outwardly to derail the drive chain 28 from one sprocket to an adjacent sprocket. Further rotational speed of the shaft 82 forces the collar assembly 94 to further extend outwardly, and lever 110 pivots on the collar assembly 94 to extend further outwardly, thereby further causing the chain guide assembly 58 to move further outwardly to derail the drive chain 28 to another sprocket. Eventually, the centrifugal weights 102 have flared outwardly to their maximum position as shown in FIGS. 3 and 4 wherein the drive chain 28 is positioned on the least diameter sprocket 44.

As shown in FIG. 1 in conjunction with FIGS. 2-5, the range selector 120 of the invention comprises a selector lever 122 connected to a cable assembly 124 consisting of an outer sheath 126 and an extensible inner cable 128. The selector lever 122 is conveniently positioned at or near the handle bars of the bicycle with the cable assembly 124 extending to a mount 130 integral with the base member 46. The cable 128 extending from the sheath 126 is affixed to a spring tensioner 132 positioned concentrically in spring 74. The spring tensioner 132 is configured in such a manner that upon extension of the cable 128 from within sheath 126, the spring tensioner 132 rotates relative to spring 74 and decreases the torsional tension of the spring 74. As a result, spring 74 exerts less bias to the linkage members 52 and 54 thereby assuring that the linkage members 52 and 54 will be more easily urged outwardly by the centrifugal force of the weights 102. Hence, range selector 120 allows the bicyclist to define a higher gear range of operation at a given speed so that the bicycle will easily upshift to the higher gears. Conversely, upon retraction of the cable 128 within sheath 126, the spring tensioner 132 increases the torsional tension of the spring 74. As a result, spring 74 exerts greater bias to the linkage members 52 and 54 thereby assuring that greater centrifugal force will be required to urge the linkage members 52 and 54 outwardly for upshifting.

Figure 11:
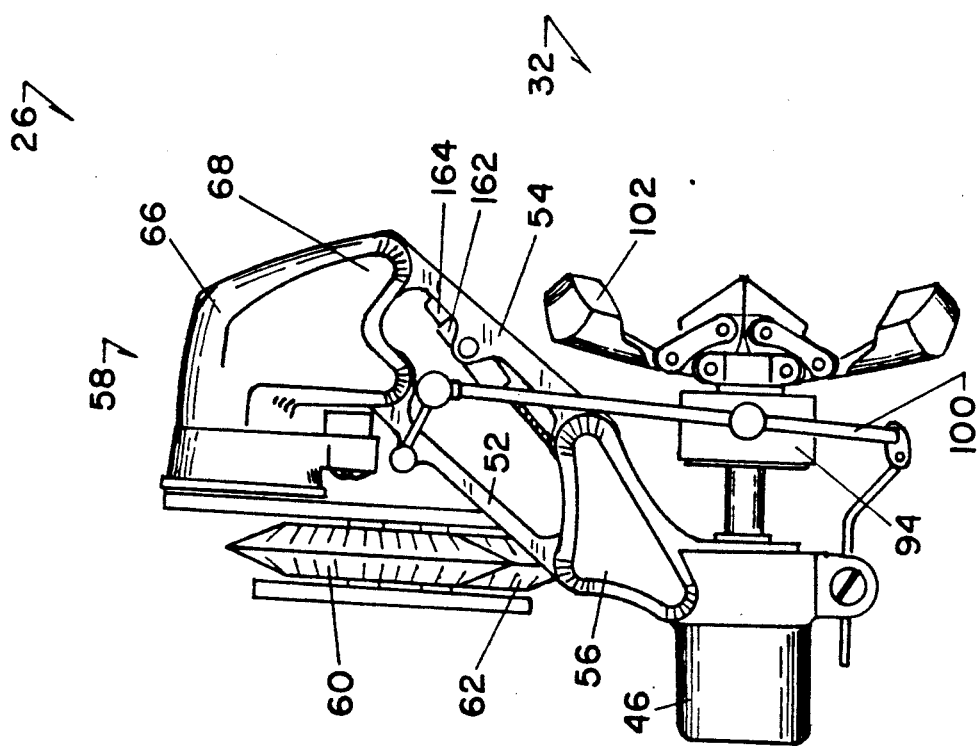
FIG. 11 is a partial top elevational view of FIG. 6 illustrating the control wire of the gear limiter restricting the outward movement of the derailer thereby limiting the highest gear into which the derailer may shift into.
Figure 10:
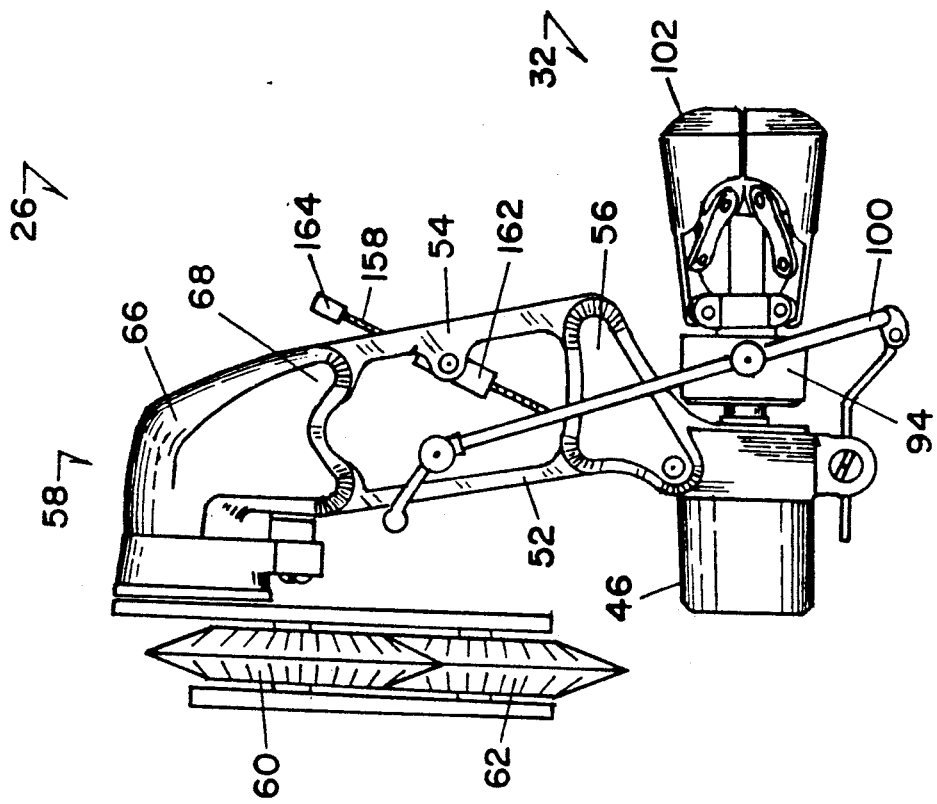
FIG. 10 is a partial top elevational view of FIG. 6 illustrating the manner in which the yoke is pivotably connected to the sleeved collar and the linkage members of the derailer.

FIGS. 6-11 illustrate another embodiment of the rear derailer 32 of the invention which functions in the same manner as the first embodiment shown in FIGS. 2-5 to derail the drive chain 28 from a sprocket in which it is engaged to a adjacent sprocket thereby effectuating speed changes. However, in this embodiment, the linkage members 52 and 54, the protruding end 56 of the base member 46 and the protruding end 68 of the boss 66 of the rear derailer 32 are dimensioned and configured such that, as shown in FIG. 11, the expanded centrifugal weights 102 are substantially flush with the protruding end 68 of the boss 66 so as to prevent the centrifugal weights 102 from being damaged in the event of an accident. Furthermore, this embodiment as shown in FIGS. 6-11, includes a gear limiter, generally indicated by numeral 150, which functions to limit the outward movement of the linkages 52 and 54. Specifically, the gear limiter 150 of the invention comprises a selector lever 152 connected to a cable assembly 154 consisting of an outer sheath 156 and an extensible inner cable 158. The selector lever 152 is conveniently positioned at or near the handle bars of the bicycle with the cable assembly 154 extending to a mount 160 pivotably connected to the protruding end 56 of the base member 46. The cable 158 extending from the sheath 156 of the cable assembly 154 slideably extends through a sleeve 162 pivotably connected to the outward linkage member 54. A stop 164 is rigidly connected to the tip of the cable 158. Finally, as shown in FIG. 1, both the range selector 120 and the gear limiter may be incorporated into the same derailer of the invention.

In operation, as the linkages 52 and 54 of the derailer 26 extend outwardly, the cable 158 is permitted to freely slide within sleeve 162. However, as shown in FIG. 11, the length of the cable 158 protruding from the sheath 156 may be adjusted via lever 152 in such a manner that the outward movement of the linkage members 52 and 54 may be limited when the stop 164 engages against the sleeve 162. Since the outward movement of the linkage members 52 and 54 may be limited in this manner, it should be readily appreciated that the bicyclist can select the highest gear into which the derailer 26 may be shifted into, irrespective of the speed of the bicycle.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, What is claimed is:

1. A derailer for derailing a drive chain from one sprocket to an adjacent sprocket of a multi-stage sprocket assembly, comprising in combination:
   a base member having a longitudinal axis;
   means for connecting said base member relative to the multi-stage sprocket assembly;
   a chain guide assembly for moving the drive chain to derail the drive chain from one sprocket to an adjacent sprocket of the multi-stage sprocket assembly;
   means for pivotably linking said chain guide assembly to said base member allowing said chain guide assembly to move;
   a shaft rotatably journalled at said longitudinal axis;
   means for interconnecting said shaft with the multi-stage sprocket assembly such that said shaft is rotated upon rotation of the multi-stage sprocket assembly;
   a centrifugal weight; and
   means for interconnecting said centrifugal weight with said shaft and said chain guide assembly such that said centrifugal weight is moved in response to the rotational speed of said shaft and upon movement of said centrifugal weight, said chain guide assembly is moved.

2. The derailer as set forth in claim 1, wherein said longitudinal axis is positioned parallel to the axis of rotation of said multi-stage sprocket assembly.

3. The derailer as set forth in claim 2, wherein said means for interconnecting said shaft with the multi-stage sprocket assembly comprises a drive gear rigidly connected to the multi-stage sprocket assembly in geared engagement with a corresponding gear rigidly connected to said shaft such that said shaft is rotated upon rotation of the multi-stage sprocket assembly.

4. The derailer as set forth in claim 1, wherein said means for interconnecting said centrifugal weight with said shaft and said chain guide assembly comprises a yoke interconnecting said centrifugal weight and said chain guide assembly such that upon movement of said centrifugal weight, said yoke and said chain guide assembly are correspondingly moved.

5. The derailer as set forth in claim 4, wherein said means for interconnecting said centrifugal weight with said shaft and said chain guide assembly further comprises a collar rotatably and slideably connected about said shaft with said yoke being pivotably connected to said collar and means interconnecting said centrifugal weight with said collar such that upon rotation of said shaft, said centrifugal weight moves said collar longitudinally along said shaft causing movement of said yoke.

6. The derailer as set forth in claim 5, wherein one end of said yoke is pivotably connected to said linkage means and wherein another end of said yoke is pivotably connected relative to said base member with said yoke being pivotably connected to said collar between said ends.

7. The derailer as set forth in claim 1, further comprising a plurality of said centrifugal weights.

8. The derailer as set forth in claim 1, further comprising means for biasing said drive chain assembly in one direction.

9. The derailer as set forth in claim 8, further comprising means for adjusting the amount of force exerted by said bias means to move said drive chain assembly.

10. The derailer as set forth in claim 9, wherein said adjusting means comprises a control wire operable by means of a control lever.

11. The derailer as set forth in claim 8, further comprising means for limiting movement of said drive chain assembly.

12. The derailer as set forth in claim 11, wherein said limit means comprises a control wire operable by means of a control lever.

* * * * *